(No Model.) 2 Sheets—Sheet 2.

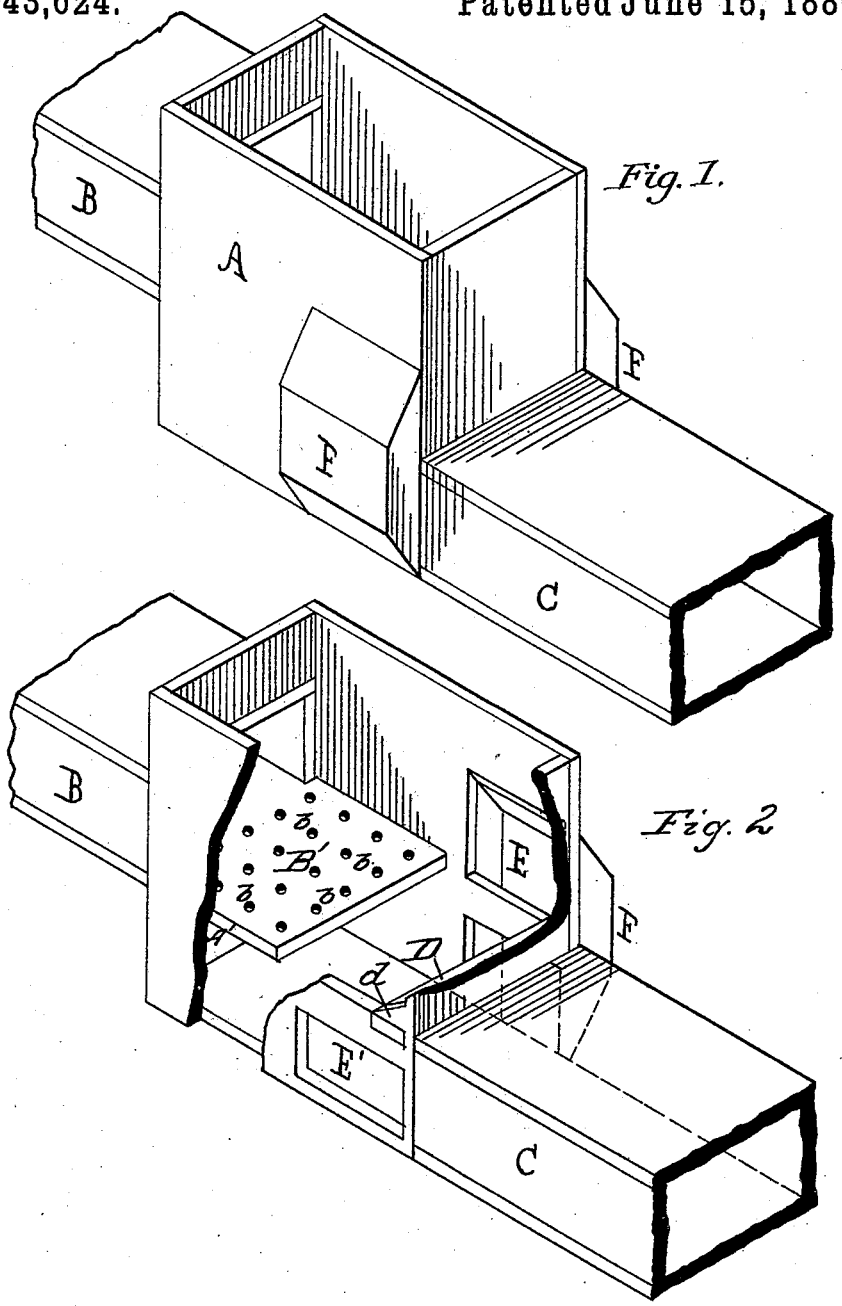

B. D. CROCKER.
METHOD OF CLEANING GRAIN.

No. 343,624. Patented June 15, 1886.

Witnesses
Geo. H. Stockbridge
E. C. Brown.

Inventor
Benjamin D. Crocker
By his Attorneys
Whittlesey & Wright.

UNITED STATES PATENT OFFICE.

BENJAMIN D. CROCKER, OF WALLA WALLA, WASHINGTON TERRITORY.

METHOD OF CLEANING GRAIN.

SPECIFICATION forming part of Letters Patent No. 343,624, dated June 15, 1886.

Application filed January 29, 1886. Serial No. 190,210. (No model.)

*To all whom it may concern:*

Be it known that I, BENJAMIN D. CROCKER, a citizen of the United States, residing at Walla Walla, in the county of Walla Walla, Washington Territory, have invented certain new and useful Improvements in the Method of Cleaning Grain; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to methods of cleaning grain, and has for its object the production of a current of air for the purpose of removing from the grain any light foreign substances, such as chaff, dust, &c. Ordinarily a fan or some such mechanical blower is used, requiring a steam-engine or other prime motor to drive it, and producing a forced blast. It has also been proposed to utilize the blast of air which is created by the passage of the grain through a long inclined pipe, the action of the grain being somewhat analogous to that of the water in the European water-blowing machine or tromp. My invention differs from these in that it operates upon the principle of the well-known steam-siphon, or that of an atomizer. I cause the grain to rush rapidly through a tube, chute, or other conduit, and across the inner ends of passages or apertures therein, which constitute air-tubes located adjacent to the path of the moving grain, and communicating with the outer air. The result is that the air is sucked in through said passages, air-tubes, or inlets, thereby generating currents which enter the mass of grain at an angle to the line of its movement, and which blow out all the dust, chaff, and other light foreign substances. In this way I cause the column of moving grain to clean itself without using any fan, bellows, or other blowing device.

An apparatus for carrying out my method is shown in the accompanying drawings, in which—

Figure 3:
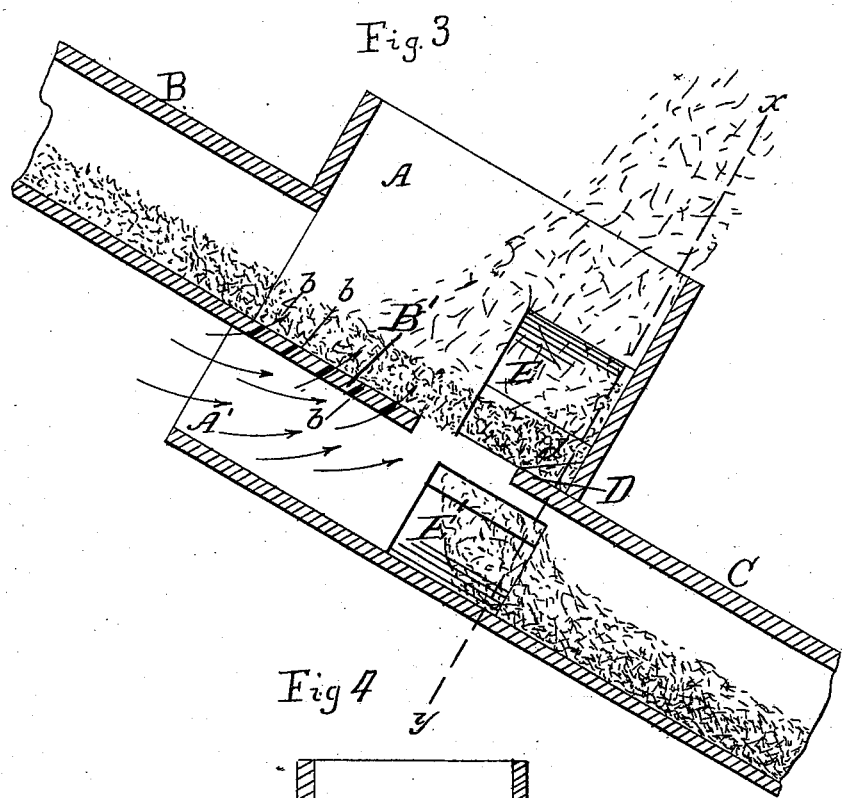
Figure 4:
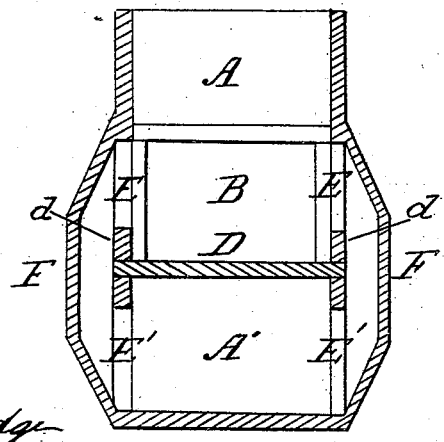

Figure 1 is a perspective view. Fig. 2 is a similar view, certain parts being broken away to disclose the interior arrangement. Fig. 3 is a longitudinal section; and Fig. 4 is a cross-section on line $x\,y$, Fig. 3.

A is a box, partially or wholly open at the top. At about the middle of one end enters a chute, B, the bottom B' of which extends into the box A, and is perforated with a number of holes or inlets, $b\,b$, which are preferably inclined, as shown. These inlets communicate with the outer air, since below the chute B is an opening, A'. It may be found desirable to protect this opening A' and also the top of the box A with wire-gauze or the like, to prevent the entrance of dirt, rats, and other objectionable things. Connected with the other end of the box A is another chute, C, the bottom of which is in the same plane as the bottom of box A. Projecting from the inside of this end of the box is a shelf, D, which has low side pieces, $d\,d$, and is located in about the same plane as the perforated bottom B' of chute B.

In each side of the box A and adjacent to the ends of the shelf D are openings E E'. If desired, that part of the side of the box which is shown in the drawings as left between these two openings may be cut away, throwing both openings into one. On the outside of the box A are two smaller boxes, F F, which preferably have inclined tops and bottoms, and cover the openings E E'. The chutes are, of course, more or less inclined, as shown, in order to cause the grain to descend through them, chute B being the higher.

The operation of this apparatus is as follows: The stream of grain enters the box A from chute B with considerable velocity, and in passing over the holes or inlets $b\,b$ acts—like the air-jet of an atomizer—to produce a partial vacuum and suck the air in through said holes or inlets and also through the open space between the end of bottom B' and shelf D. The currents thus generated enter the mass of grain at an angle to the line of its movement, and blow out of it all chaff, dust, and other light impurities. These pass out through the open top of box A, which is high enough, however, to keep the grain from escaping. Meanwhile the grain shoots across the open space at the end of B', heaps up on shelf D, overflows at each end, and passes through the openings E, boxes F, and openings E' to the lower chute, C. The shelf D retains a small heap of grain, which acts as a cushion to receive the descending stream, and prevents the kernels from being bruised or broken as they would be did they strike upon a hard rigid substance. By using a series of these chutes and boxes to form a continuous conduit from the upper part of an elevator to the discharge-spout, the grain will be effectually cleaned. The boxes also act to check the velocity of the grain and enable it to be more readily handled.

I do not herein make any claim to the above-described apparatus, as that constitutes the subject-matter of a separate application filed herewith, Serial No. 190,209; but What I do claim, and desire to secure by Letters Patent, is—

As an improvement in the art of cleaning grain, the method of producing a current of air through the same, which consists in causing a stream of grain to move rapidly across one end of an open air-tube, located adjacent to the path of the moving grain, whereby a partial vacuum is formed in said tube, which causes the air to be sucked in, and thus sets in motion a current of air which blows across the stream of grain, substantially as herein described and set forth.

In testimony whereof I affix my signature in presence of two witnesses.

BENJAMIN D. CROCKER.

Witnesses:
GEO. T. THOMPSON,
C. M. STEARNS.